United States Patent
Matsen et al.

(10) Patent No.: US 11,724,420 B2
(45) Date of Patent: Aug. 15, 2023

(54) PRECURSOR FABRICATION FOR HIGH-TEMPERATURE PRESSURE MEMBRANES

(71) Applicant: The Boeing Company, Chicago, IL (US)

(72) Inventors: Marc R. Matsen, Seattle, WA (US); Lee Charles Firth, Renton, WA (US); Randall D. Wilkerson, O'Fallon, MO (US); Julie F. Murphy, Puyallup, WA (US); Ravi Verma, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 645 days.

(21) Appl. No.: 16/204,260

(22) Filed: Nov. 29, 2018

(65) Prior Publication Data

US 2020/0171711 A1    Jun. 4, 2020

(51) Int. Cl.
*B29C 33/38* (2006.01)
*B21D 26/031* (2011.01)
*B33Y 10/00* (2015.01)
*B33Y 80/00* (2015.01)
*B29C 70/42* (2006.01)

(52) U.S. Cl.
CPC ........ *B29C 33/3842* (2013.01); *B21D 26/031* (2013.01); *B29C 70/42* (2013.01);
(Continued)

(58) Field of Classification Search
CPC .... B29C 2043/3644; B29C 2043/3647; B29C 2043/3649; B29C 2043/108; B29C 41/00;
(Continued)

(56) References Cited

U.S. PATENT DOCUMENTS 4,338,070 A * 7/1982 Nava ................... B29C 43/3642
425/112
5,468,331 A * 11/1995 Makarenko ............. B29C 70/44
156/382

(Continued)

OTHER PUBLICATIONS

B.R. Powell; P.E. Krajewski, "Magnesium alloys for lightweight powertrains and automotive bodies," Advanced Materials in Automotive Engineering, 2012, Retrieved from: https://www.sciencedirect.com/science/article/pii/B9781845695613500077 (Year: 2012).*

(Continued)

*Primary Examiner* — Francisco W Tschen
*Assistant Examiner* — Edgaredmanuel Troche
(74) *Attorney, Agent, or Firm* — Duft & Bornsen, PC

(57) ABSTRACT

Systems and methods are provided for creating precursors for consolidating composite parts. One embodiment is a method for forming a metallic structure. The method includes forming a precursor for a pressure membrane that includes a contour having a linearized length corresponding with a linearized length of a surface of a forming tool. The method also includes affixing a perimeter of the precursor to a perimeter of a base member, leaving a volume between the base member and the precursor, altering a shape of the precursor at a superplastic temperature by forcing the precursor into complementary contact with the surface of the forming tool, and setting the shape of the precursor while the precursor is held in complementary contact.

28 Claims, 13 Drawing Sheets

(52) U.S. Cl.
CPC ........... *B29K 2905/00* (2013.01); *B33Y 10/00* (2014.12); *B33Y 80/00* (2014.12)

(58) Field of Classification Search
CPC ......... B29C 41/20; B29C 41/30; B29C 41/50; B29C 43/10; B29C 43/12; B29C 43/3642; B29C 70/30; B29C 70/34; B29C 70/40; B29C 70/44; B29C 33/02; B29C 33/0011; B29C 33/0038; B29C 33/38; B29C 33/44; B29C 33/46; B29C 33/48; B29C 33/50; B29C 33/54; B29C 33/505; B29C 2033/205; B30B 11/00; B30B 11/001; B30B 11/002; B29K 2905/00; B21D 26/021; B21D 26/027; B21D 26/031; B21D 26/055
USPC ........................... 264/510; 425/112, 503, 508
See application file for complete search history.

(56) References Cited

U.S. PATENT DOCUMENTS

| | | | |
|---|---|---|---|
| 7,306,450 B2 * | 12/2007 | Hanson | B29C 70/548 425/383 |
| 8,961,732 B2 * | 2/2015 | Kennedy | B29C 70/44 156/285 |
| 9,662,742 B2 | 5/2017 | Matsen et al. | |
| 10,029,398 B2 | 7/2018 | Matsen et al. | |
| 2008/0000557 A1 * | 1/2008 | Ghosh | C22F 1/06 148/420 |
| 2015/0013888 A1 | 1/2015 | Matsen et al. | |
| 2015/0013894 A1 * | 1/2015 | Matsen | B29C 33/06 156/272.4 |
| 2019/0224937 A1 * | 7/2019 | Fanelli | B32B 1/08 |
| 2019/0366653 A1 * | 12/2019 | Carlson | B33Y 50/02 |

OTHER PUBLICATIONS

Total Materia, "Superplastic Aluminum Alloys", Jun. 2011, Retrieved from: totalmateria.com/page.aspx?ID=CheckArticle&site=ktn&NM=264 (Year: 2011).*

Michal Mls et al., "Construction of next-generation superplastic forming using additive manufacturing and numerical techniques", Published Jun. 24, 2017, https://doi.org/10.1177/0954405417716493, Retrieved from:https://journals.sagepub.com/doi/full/10.1177/0954405417716493 (Year: 2017).*

* cited by examiner

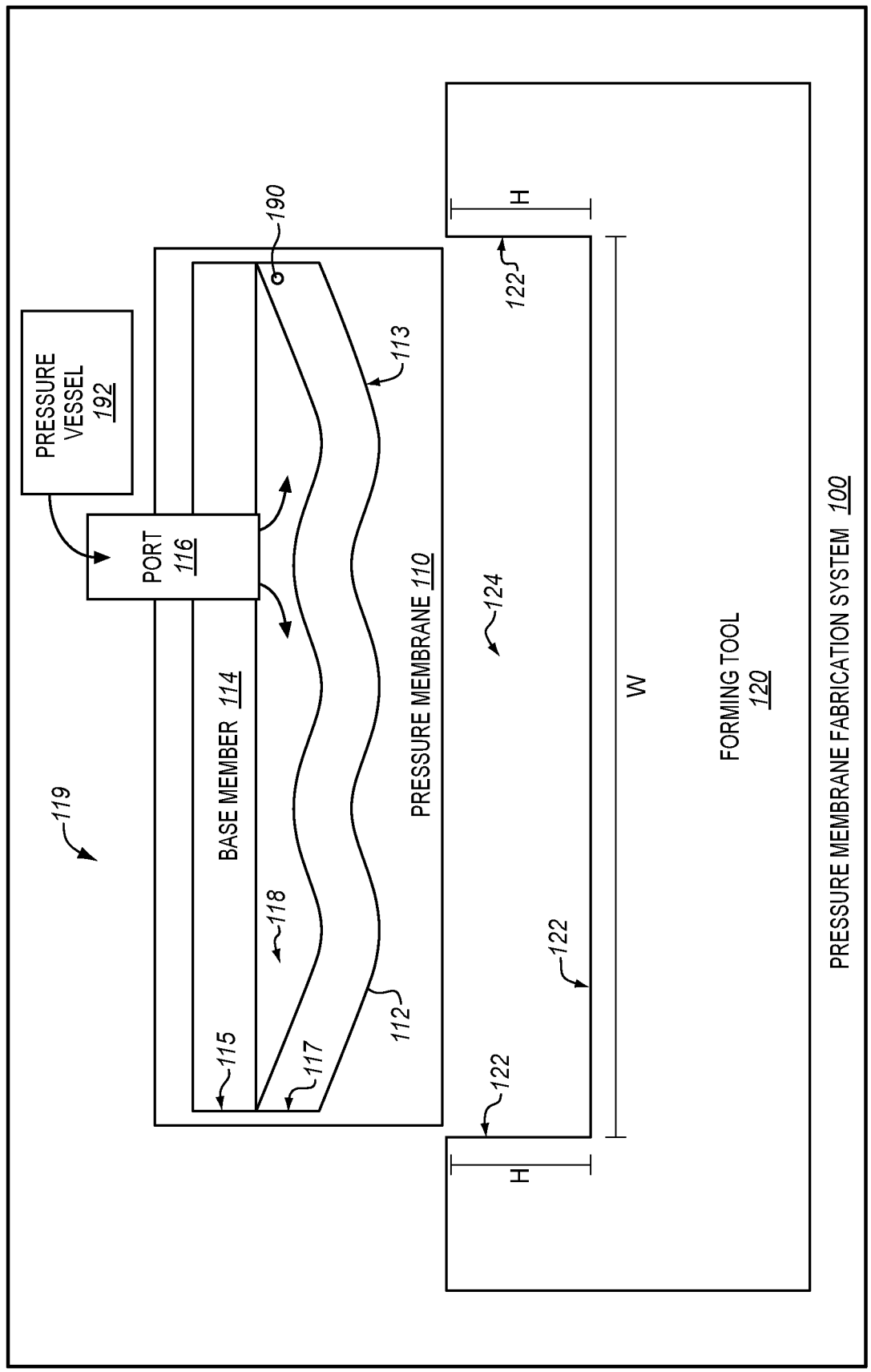

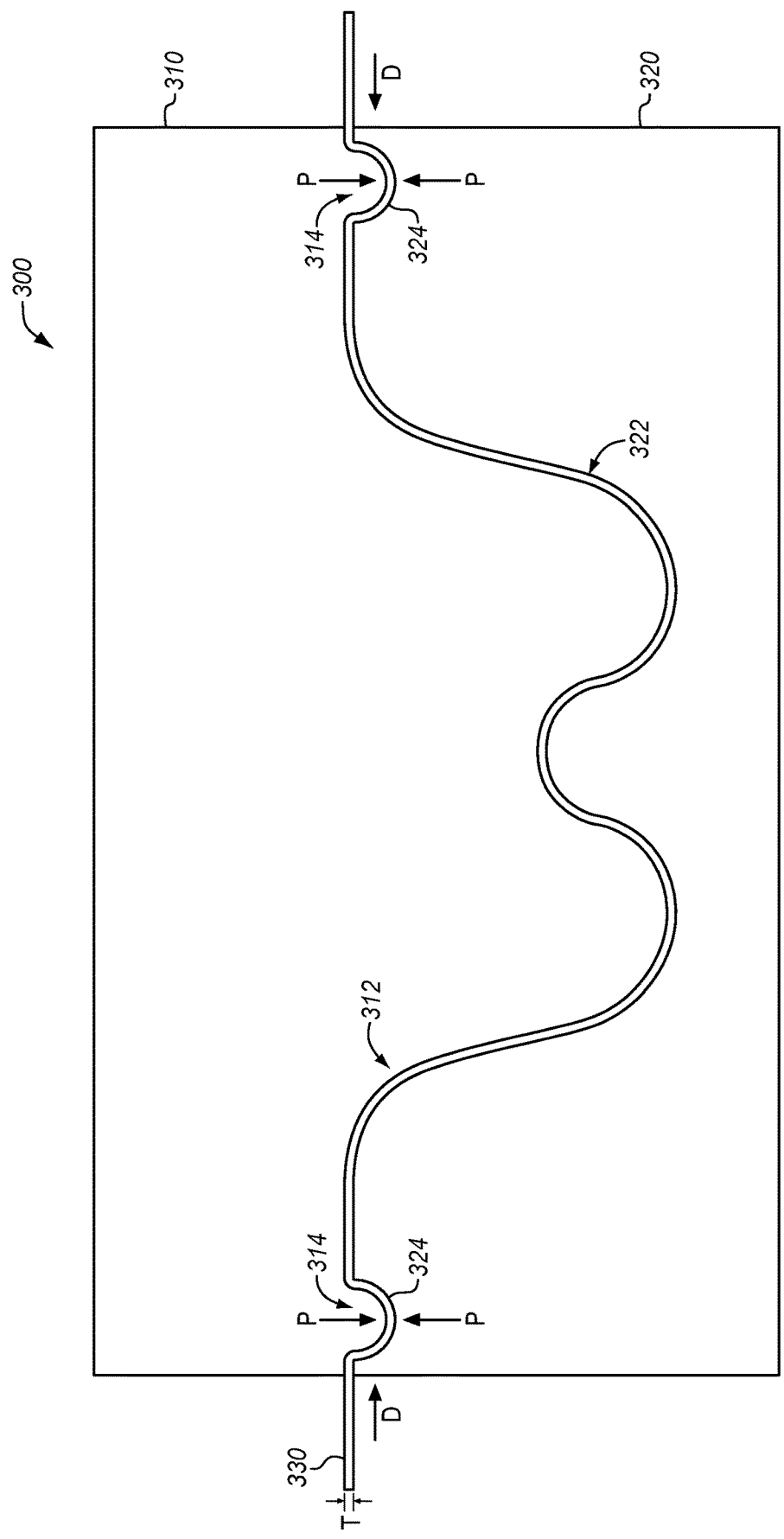

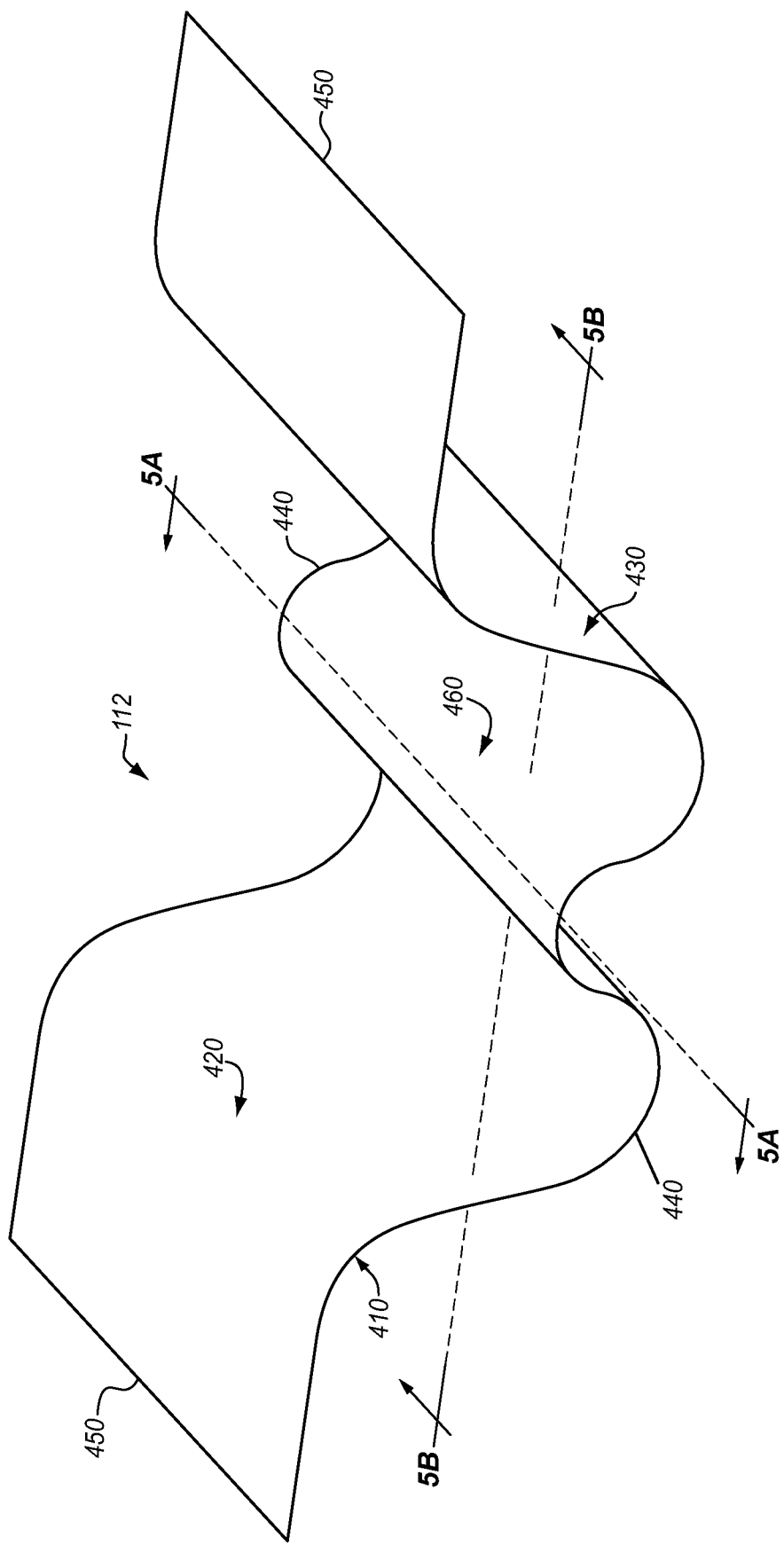

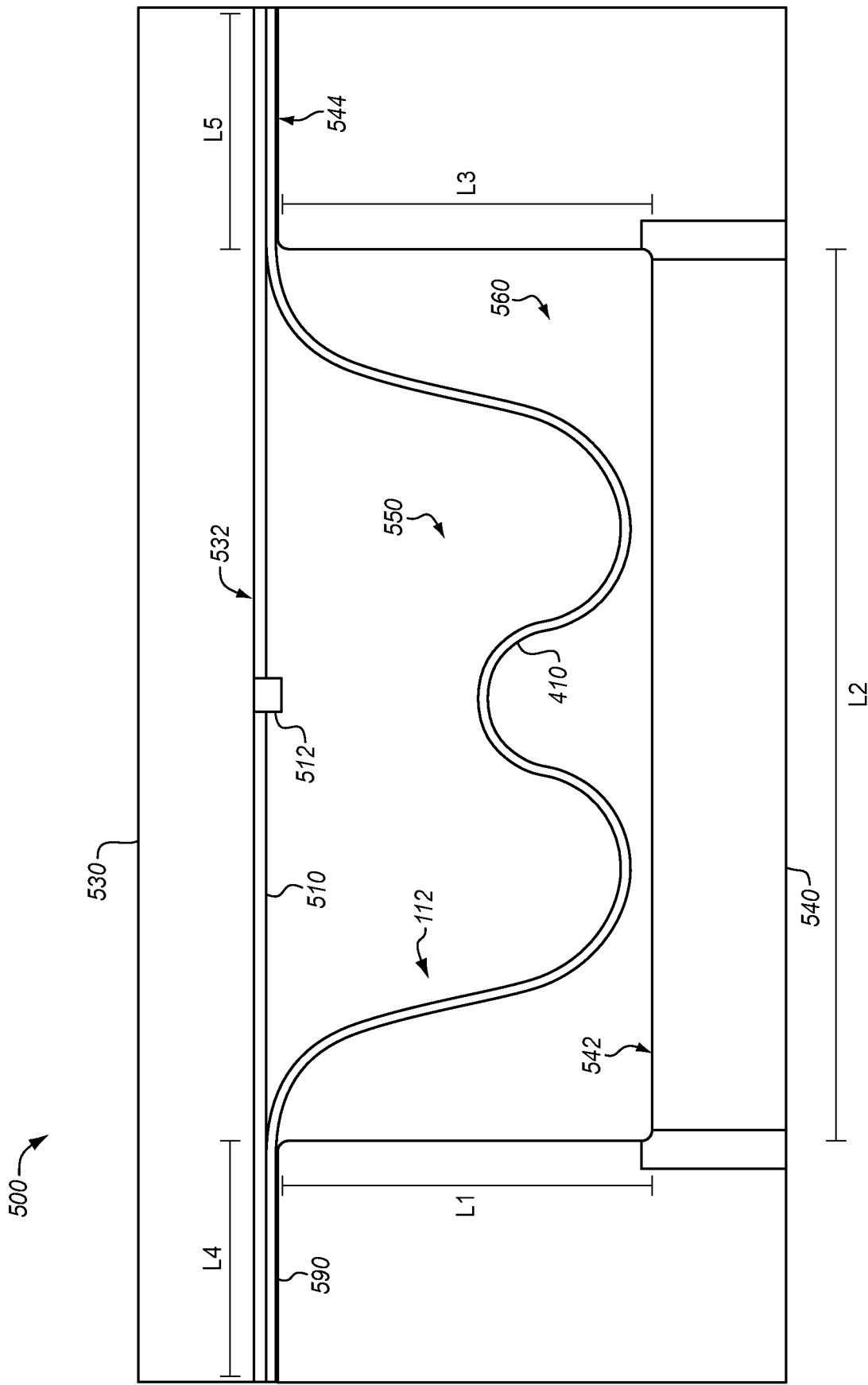

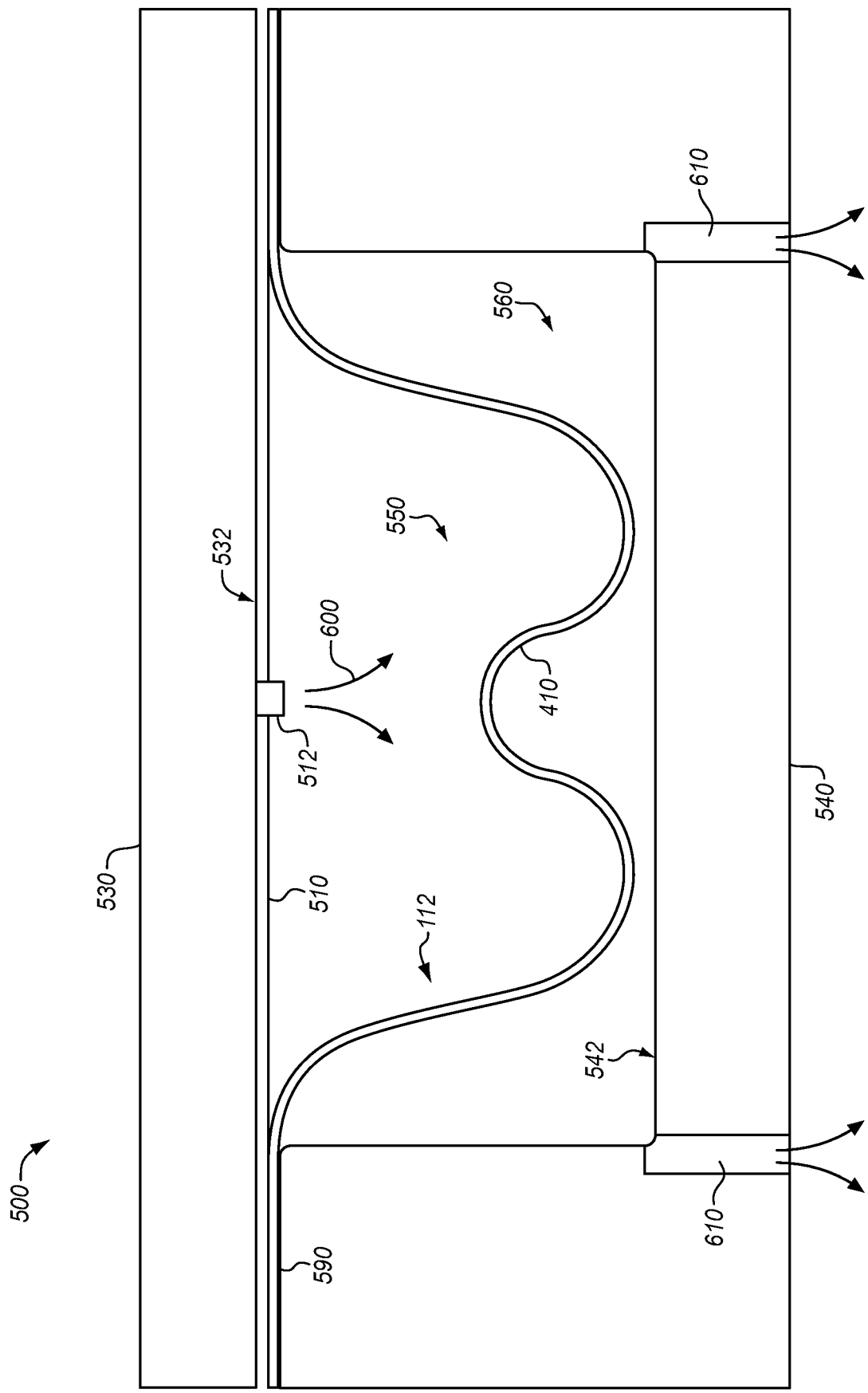

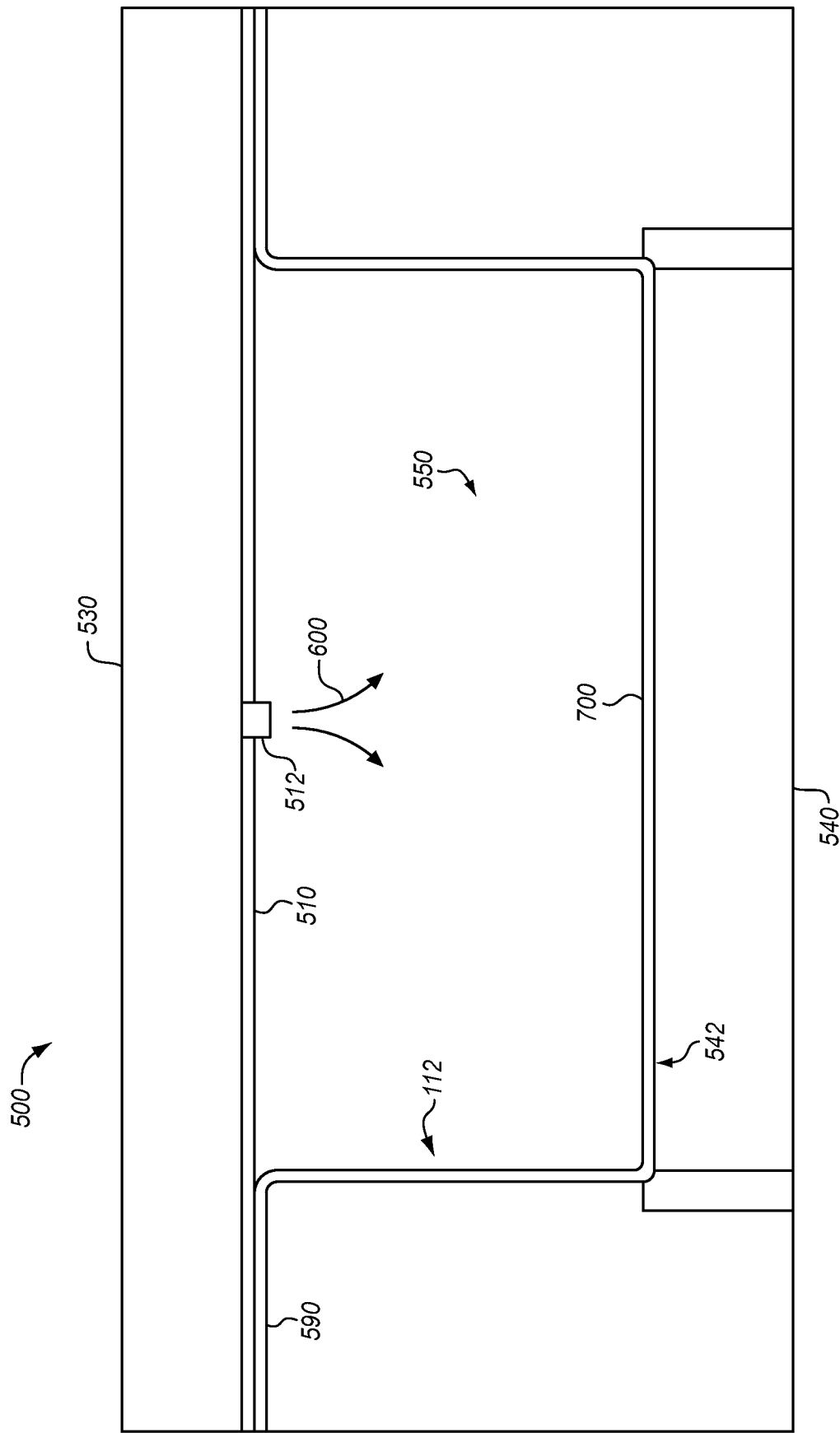

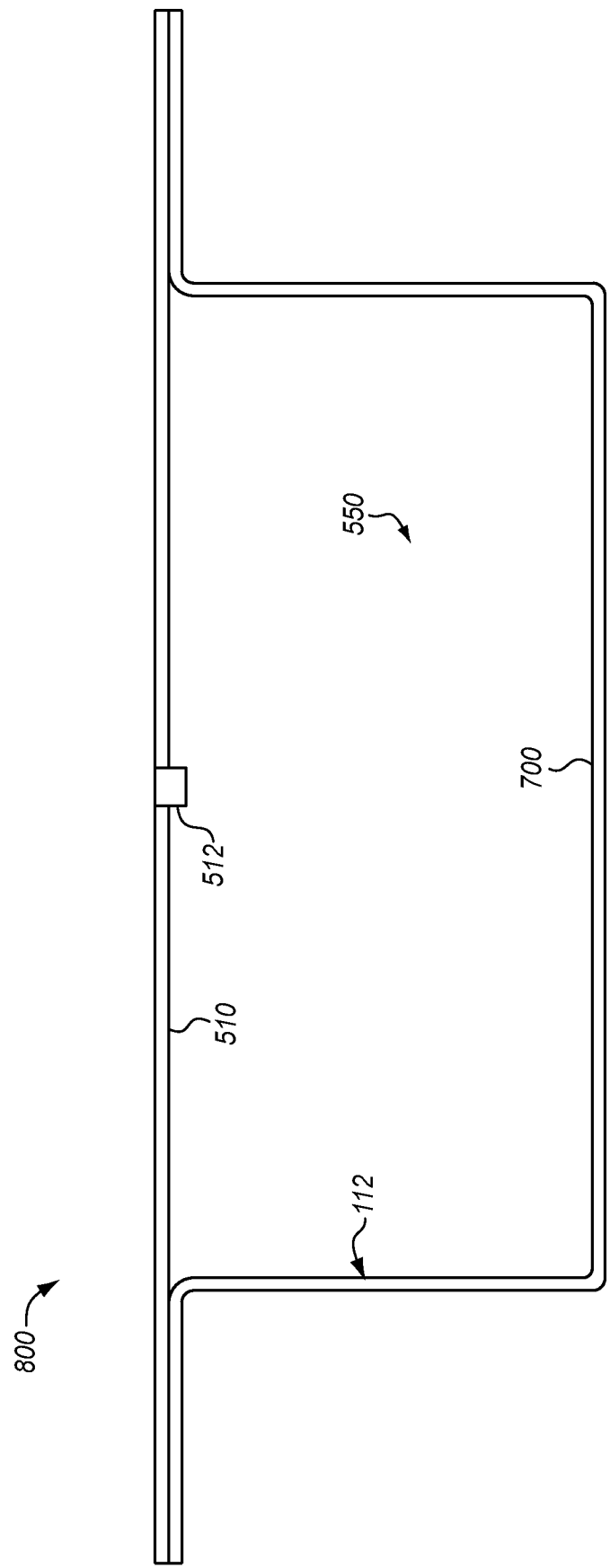

_US 11,724,420 B2_

PRECURSOR FABRICATION FOR HIGH-TEMPERATURE PRESSURE MEMBRANES

FIELD

The disclosure relates to the field of composite materials, and in particular, to pressure membranes that facilitate consolidation of composite materials at high temperatures.

BACKGROUND

Pressure membranes may be utilized to facilitate the process of consolidating a composite part, such as a preform of Carbon Fiber Reinforced Polymer (CFRP). Pressure membranes may, for example, apply pressure to a preform in order to compact one or more layers of composite material within the preform. However, fabrication of pressure membranes remains problematic, as pressure membranes must be capable of withstanding high temperatures at which consolidation occurs. Thus, many materials which would otherwise be desirable for applying consolidation pressure are not usable. Further complicating this process, it is not uncommon for pressure membranes to experience thinning or cracking during fabrication as they are shaped to desired contours. This makes some pressure membranes that are fabricated unsuitable for their intended uses.

Therefore, it would be desirable to have a method and apparatus that take into account at least some of the issues discussed above, as well as other possible issues.

SUMMARY

Embodiments described herein provide techniques for fabricating pressure membranes that are designed with features that facilitate their ability to be shaped while maintaining structural integrity during fabrication. This provides a technical benefit by reducing the risk of thinning and/or cracking. This in turn increases the number of usable pressure membranes that are fabricated, which saves labor and materials relating to composite part fabrication.

One embodiment is a manufacture in the form of a precursor. The precursor includes a perimeter configured for affixation to a base member in order to form a volume between the precursor and the base member. The precursor also includes features that facilitate shaping of the precursor at a superplastic temperature and are selected from the group consisting of: regions of increased thickness and contours. The material that the features are made from is capable of undergoing superplastic deformation.

A further embodiment is an apparatus in the form of a metal structure. The apparatus includes a pressure membrane. The pressure membrane includes a base member and a precursor that has a perimeter affixed to a perimeter of the base member leaving a volume between the base member and the precursor. The precursor includes features that facilitate shaping of the precursor by a forming tool.

A further embodiment is a method of hot forming a metallic structure. The method includes heating a precursor to a superplastic temperature, shaping the precursor to conform with a forming tool while the precursor is heated, and maintaining a thickness of the precursor after the shaping has been completed.

A further embodiment is a method for forming a metallic structure. The method includes forming a precursor for a pressure membrane that includes a contour having a linearized length corresponding with a linearized length of a surface of a forming tool. The method also includes affixing a perimeter of the precursor to a perimeter of a base member, leaving a volume between the base member and the precursor, altering a shape of the precursor at a superplastic temperature by forcing the precursor into complementary contact with the surface of the forming tool, and setting the shape of the precursor while the precursor is held in complementary contact.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 1 is a block diagram of a pressure membrane fabrication system which includes pressure vessel having a precursor suitable for shaping to a forming tool in an illustrative embodiment.

FIG. 3 is a side view of a stamping system that fabricates a precursor in an illustrative embodiment.

FIG. 4 is a perspective view of a precursor in an illustrative embodiment.

FIGS. 5A-5B and 6-7 are views of a shaping system as a precursor having a length corresponding with a forming tool is shaped into conformity with the forming tool in an illustrative embodiment.

FIG. 8 is a side view of a pressure membrane that has been fully formed in an illustrative embodiment.

DESCRIPTION

Figure 2A:
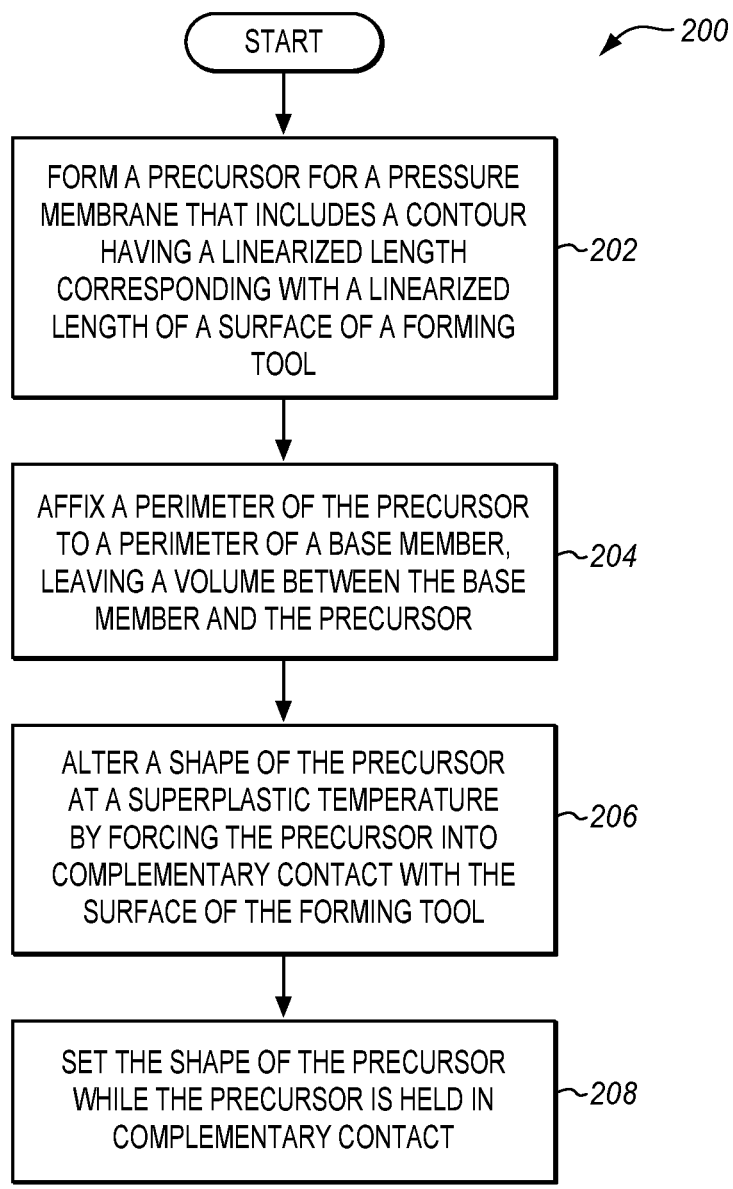
FIGS. 2A-2B are flowcharts illustrating methods for fabricating a pressure vessel in an illustrative embodiment.

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated. After preforms have been fabricated for composite parts, those preforms may be consolidated by receiving compression from a pressure membrane at a consolidation temperature (e.g., between six hundred and fifty degrees, and eight hundred degrees, Fahrenheit). Pressure membranes (also referred to as "pressure vessels") must be highly resilient to degradation at these temperatures. Furthermore, pressure membranes often must form shapes for consolidating a composite part into a C-channel, I-channel, etc.

FIG. 1 is a block diagram of a pressure membrane fabrication system 100 which includes pressure membrane 110 having a precursor 112 suitable for shaping to a forming tool 120 in an illustrative embodiment. In this embodiment, pressure membrane 110 includes precursor 112, which follows contour 113. A perimeter 117 of precursor 112 is affixed to (e.g., welded, or glued, or otherwise attached in a manner that forms an airtight seal with) a perimeter 115 of base member 114. This results in volume 118, which is disposed between base member 114 and precursor 112. The precursor 112 has grains 190 of a desired size. A port 116 is also included in pressure membrane 110. Port 116 enables pressurized gas to exit and/or enter volume 118 in a controlled manner when precursor 112 is being shaped. Thus, port 116 couples volume 118 with gas that is external to pressure membrane 110 (e.g., at pressure vessel 192 or at space 119).

Forming tool 120 comprises a mandrel or other tool which includes a surface 122. In this embodiment, surface 122 extends along a width (W) of forming tool 120, and also extends up along a height (H) of indentation 124. Thus, if surface 122 were linearized (e.g., laid out along a line), its length would be W+2H. This length of W+2H is the linearized length of precursor 112, after precursor 112 has been shaped. Hence, surface 122 defines the final shape of precursor 112. That is, the length of the precursor 112 prior to superplastic forming is equal to the linearized length of the surface 122 and is therefore sufficient for shaping. Thus, precursor 112 does not have to be elongated during superplastic forming (which could result in undesired thinning). For example, in some embodiments the precursor 112 may not be stretched at all, while in other embodiments, it may stretch up to an additional fifty percent.

Precursor 112 will be shaped into conformance with surface 122 during a shaping process, such as during a superplastic deformation process wherein precursor 112 is heated to a superplastic temperature and then pressurized (e.g., via the introduction of gas into volume 118) into conformance with forming tool 120. Forming tool 120 may be implemented as a press, where one die is a contour of the forming tool 120, and the other die is pressurized inert gas (inflated or vacuum). The precursor 112 is shaped between these two dies.

Precursor 112 includes features such as contours (e.g., contour 312 and contour 322 of FIG. 3) or regions of increased thickness (e.g., regions 910 of FIG. 9) which facilitate the shaping of precursor 112 in conformance with surface 122. These features prevent the precursor 112 from experiencing excessive thinning or cracking during shaping, which provides a technical benefit by reducing the number of pressure vessels which are discarded or recycled. After a pressure membrane 110 has been fabricated, pressure membrane 110 may be used multiple times to consolidate preforms at a consolidation temperature, without degrading.

Illustrative details of the operation of pressure membrane fabrication system 100 will be discussed with regard to FIGS. 2A-2B. Assume, for this embodiment, that a precursor 112 has been created from a sheet of metal such as aluminum, titanium, magnesium, or any metal capable of undergoing superplastic deformation (e.g., a metal capable of plastically deforming to more than two hundred percent of its original length under tensile stress, or a material having a strain rate sensitivity of more than three tenths). In some embodiments, the metal may even be a form of steel or titanium.

Figure 2B:
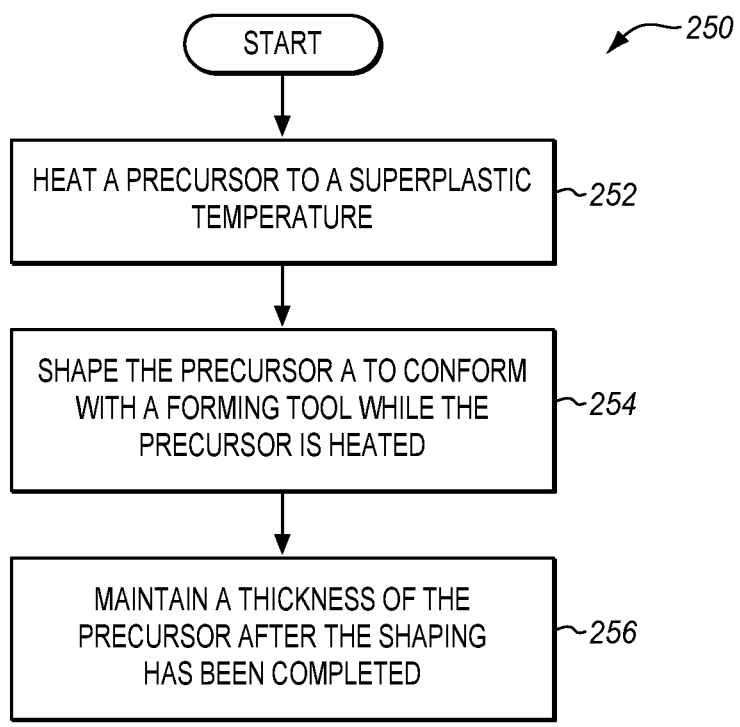

FIGS. 2A-2B are flowcharts illustrating methods for fabricating a pressure vessel in an illustrative embodiment. The steps of these methods are described with reference to pressure membrane fabrication system 100 of FIG. 1, but those skilled in the art will appreciate that these methods may be performed in other systems. The steps of the flowcharts described herein are not all inclusive and may include other steps not shown. The steps described herein may also be performed in an alternative order.

FIG. 2A depicts a method 200 for fabricating a pressure vessel in an illustrative embodiment. In step 202, method 200 includes forming a precursor 112 for a pressure membrane 110. The precursor 112 includes a contour 113 having a linearized length corresponding with a linearized length of a surface of a forming tool. That is, if the contour 113 were straightened, its length would correspond with that of surface 122 (e.g., W+2H). The contour 113 may similarly have a linearized width corresponding to that of surface 122. Precursor 112 may be formed using stamping techniques, via incremental sheet forming, or via other processes as will be described below. For example, incremental sheet forming can be used to fabricate a precursor 112 that has a desired thickness and a length and width equal to the linearized length and width of surface 122.

Once formed, precursor 112 is suitable for undergoing shaping to conform with surface 122 (e.g., via superplastic deformation techniques). The material from which precursor 112 is made may also exhibit a grain size between one and ten micrometers. The smaller the grain size, the greater the degree of superplasticity. Thus, the feature of small grain size provides a technical benefit by facilitating superplastic deformation of precursor 112.

In step 204, perimeter 117 of precursor 112 is affixed to perimeter 117 of base member 114. This leaves volume 118 between the base member 114 and the precursor 112. In this embodiment, the affixation of perimeter 117 to perimeter 115 is airtight. The affixation process may be performed via gluing, taping, welding, etc. However, it is desirable for the affixation technique to be resistant to failure at superplastic temperatures. In step 206, a shape of precursor 112 is altered at a superplastic temperature, by forcing the precursor 112 into complementary contact with (e.g., in contiguous contact across the entirety of) surface 122 of forming tool 120. That is, precursor 112 is superplastically deformed at a superplastic temperature (e.g., between six hundred and sixteen hundred degrees Fahrenheit, depending on the material used) and pressure (e.g., between twenty and six hundred pounds per square inch). This deformation process may be performed by inflating (e.g., pressurizing) the volume 118 until the precursor 112 is held in contiguous contact with surface 122 of forming tool 120, or otherwise increasing the volume 118. That is, the precursor 112 is held in contact along the entirety of surface 122, or along a substantial percentage thereof (e.g., ninety percent, or eight percent). Because the linearized length of the precursor 112 corresponds with a linearized length of the surface 122, inflating the volume 118 maintains a thickness of the precursor 112 and does not stretch the precursor 112.

In step 208, the shape of precursor 112 is set while the precursor 112 is held in complementary contact with surface 122. This may be performed by cooling the precursor 112. This causes the precursor 112 to exit the superplastic state. With the steps above being performed, pressure vessel 110 has been formed into a desired shape, and now may be used repeatedly in order to consolidate composite preforms at a consolidation temperature, and without degradation. Method 200 itself provides a technical benefit in that it prevents the precursor 112 from stretching too thin or cracking at corners along the surface 122 of the forming tool 120, which saves both time and labor. Furthermore, method 200 may be applied to any suitable structures and is not limited to pressure vessels. Method 200 may, for example, be used for any structure having boundaries that could be otherwise thinned beyond desired amounts.

FIG. 2B depicts a method 250 for fabricating a pressure vessel in an illustrative embodiment. In step 252, a precursor 112 (e.g., at a metal pressure vessel such as pressure membrane 110) is heated to a superplastic temperature. For example, the metal pressure vessel may be heated to a temperature at which it exhibits superplastic properties. In step 254, the precursor 112 is shaped to conform with forming tool 120 while the precursor 112 is heated. For example, precursor 112 may be inflated or stamped to the desired shape. In step 256, a uniform thickness of the precursor 112 is maintained after the shaping has been completed. That is, the precursor 112 exhibits a uniform thickness along its length after shaping has been completed. This may be a result of the precursor 112 having a linearized length corresponding with a linearized length of the surface 122. Alternatively, this may be a result of precursor 112 being thicker in certain regions where stretching/deformation are expected to occur during the shaping process. During the shaping process, those regions may reduce in thickness to achieve the thickness of other regions, resulting in the precursor 112 exhibiting a uniform thickness.

FIG. 3 is a side view of a stamping system 300 that fabricates a precursor 112 in an illustrative embodiment. Stamping system 300 fabricates the precursor 112 prior to superplastic deformation (e.g., at a reduced temperature, such as room temperature), and does so in a manner that causes precursor 112 to match a desired length of a surface of a forming tool while exhibiting a uniform thickness (T). In this embodiment, stamping system 300 includes die 310 and die 320, which stamp a sheet 330 of uniform thickness according to a contour 312 and a contour 322 that is corresponding. The dies in combination stamp the sheet 330 into the contour 113. During the stamping process, pressure (P) is controlled between beads 314 and divots 324. This enables more material from sheet 330 to be drawn in to fabricate the precursor in a limited fashion without forming wrinkles, as indicated by the arrows (D).

FIG. 4 is a perspective view of a precursor 112 in an illustrative embodiment. for example, precursor 112 may be fabricated via stamping system 300 described above. In this embodiment, precursor 112 conforms with contour 410, and includes upper surface 420 as well as lower surface 430, which define arch 460. Edges 440 and edges 450 of precursor 112 may be sealed to base member 114 via any suitable technique. For example, intermediary flanges may be used as an extension of precursor 112 and base member 114. The flanges may be shaped to include edges that follow edges 440 and edges 450 which are bonded to precursor 112, and may also include flanges that mate with base member 114. In further embodiments, forming tool 120 may include a nonplanar seal bead that conforms with contour 410 and facilitates sealing of precursor 112 to base member 114. Any suitable techniques may be utilized to ensure that the resulting pressure membrane 110 is sealed. Details of the forming of precursor 112 into a desired shape are depicted below.

Figure 5A:
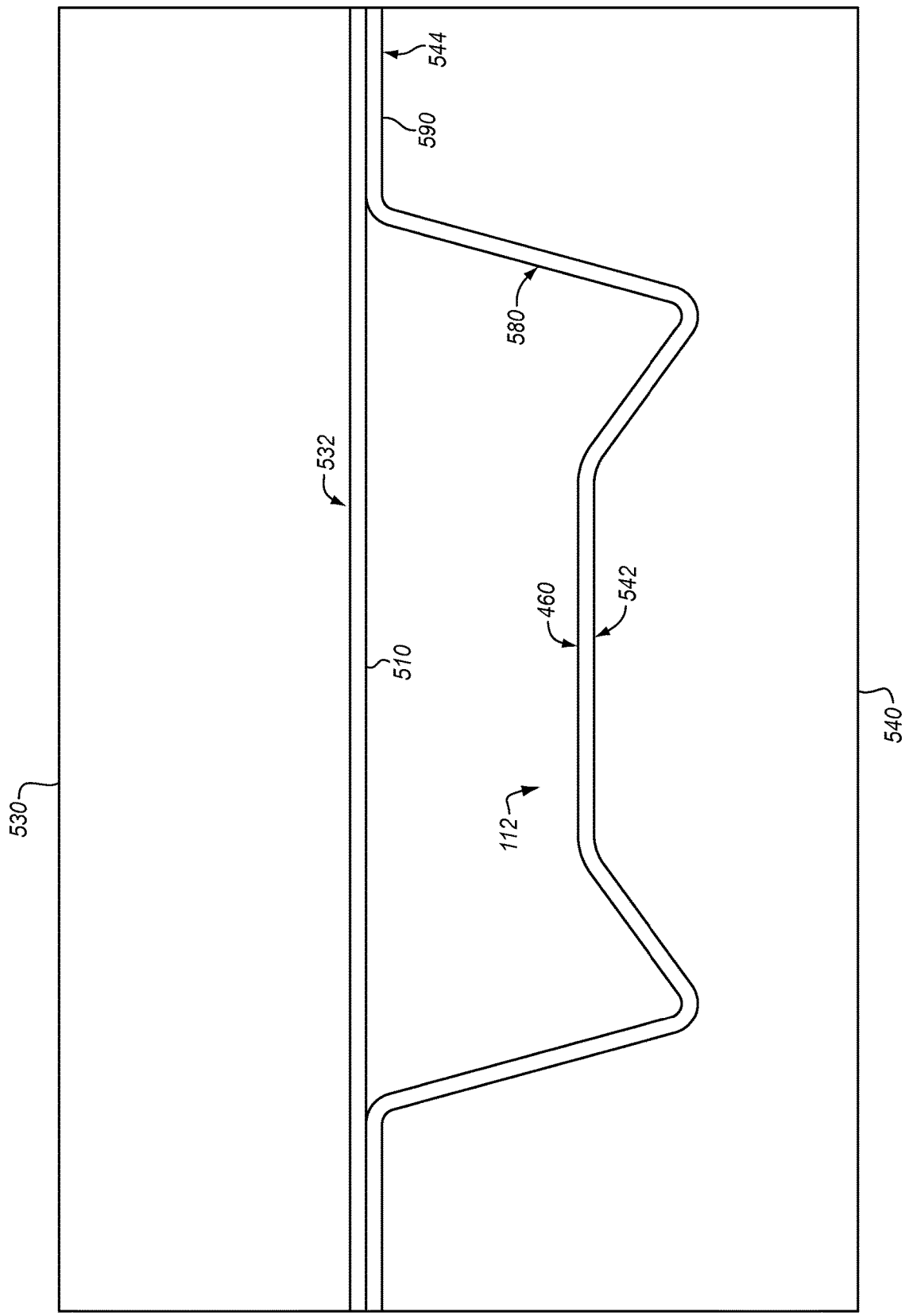

FIGS. 5A-5B and 6-7 are side views of a shaping system 500 as a precursor 112 is shaped into conformity with a forming tool 540 in an illustrative embodiment. The view in FIG. 5A corresponds with view arrows 5A of FIG. 4, and the views of FIGS. 5B, 6, and 7 correspond with view arrows 5B of FIG. 4. In FIG. 5A, precursor 112 has been affixed to base member 510. Arch 460 extends before terminating at upward ramp 580, which proceeds to flange 590 disposed at a plane where forming tool 530 and forming tool 540 meet. Flange 590 facilitates sealing of precursor 112 to base member 510 in order to form an enclosed volume.

In FIG. 5B, it can be seen that base member 510 includes a port 512 which enables pressurized gas to enter a volume 550. As more pressurized gas enters volume 550, precursor 112 is shaped and begins to occupy space 560. In this embodiment, contour 410 provides the precursor 112 with a linearized length that corresponds with a linearized length of a surface 542 of a forming tool. For example, the linearized length of precursor 112 may equal L1+L2+L3+L4+L5. The precursor 112 shown in FIGS. 5A-5B and 6-7 may be formed, for example, via stamp forming as depicted in FIG. 3. In this embodiment, forming tool 540 does not have to be sealed, so long as volume 550 is sealed from its exterior surroundings.

In embodiments where space 560 is sealed, forming tool 540 may include a port (not shown) for removing gas from space 560. In additional embodiments, precursor 112 may be formed via application of a vacuum to space 560, may be formed by pressurized forces applied to one side and a vacuum pulling on another side, etc.

Pressurization of the volume 550, while precursor 112 is in a superplastic state, causes precursor 112 to deform outward. In this embodiment, further expansion of base member 510 is prohibited by forming tool 530. Meanwhile, further expansion, shaping, or deformation of the precursor 112 is limited by the bounds of surface 542 of forming tool 540. In FIG. 6, gas 600 enters the volume 550. In many embodiments, the gas 600 is an inert gas which does not chemically react with the material that precursor 112 is made from. In embodiments where space 560 is sealed, ports 610 may be operated to vent gas from volume 560 as volume 550 expands. In FIG. 7, pressure applied by the gas 600 has plastically deformed the precursor 112 into a contour 700. Because precursor 112 has a sufficient length, it does not experience stretching during the superplastic deformation process, and therefore does not experience thinning. This provides a technical benefit by preventing cracking at the precursor 112 when the precursor is being shaped.

FIG. 8 is a side view of a pressure membrane 800 that has been fully formed in an illustrative embodiment. According to FIG. 8, pressure membrane 800 includes base member 510, which includes port 512. Port 512 may be sealed as desired now that the pressure membrane 800 is in its desired shape. Pressure membrane 800 also includes precursor 112, which is formed to contour 700. Having achieved a desired shape, pressure membrane 800 may be utilized to consolidate preforms for composite parts as desired, and without degradation at the consolidation temperature. Thus, pressure membrane 800 may be utilized as a consolidation tool for composite preforms. In this embodiment, pressure membrane 800 forms a shape for consolidating a composite preform into a C-channel. However, in further embodiments, pressure membrane 800 forms a shape for consolidating a composite preform into other shapes (e.g., an I-channel) or even shapes with complex contours (e.g., dome shapes, etc.). Pressure membrane 800 may even be shaped to accommodate the consolidation of preforms having non-uniform cross-sections along their length. Pressure membrane 800 may be 3D printed in some embodiments in order to accommodate such shapes.

Figure 9:
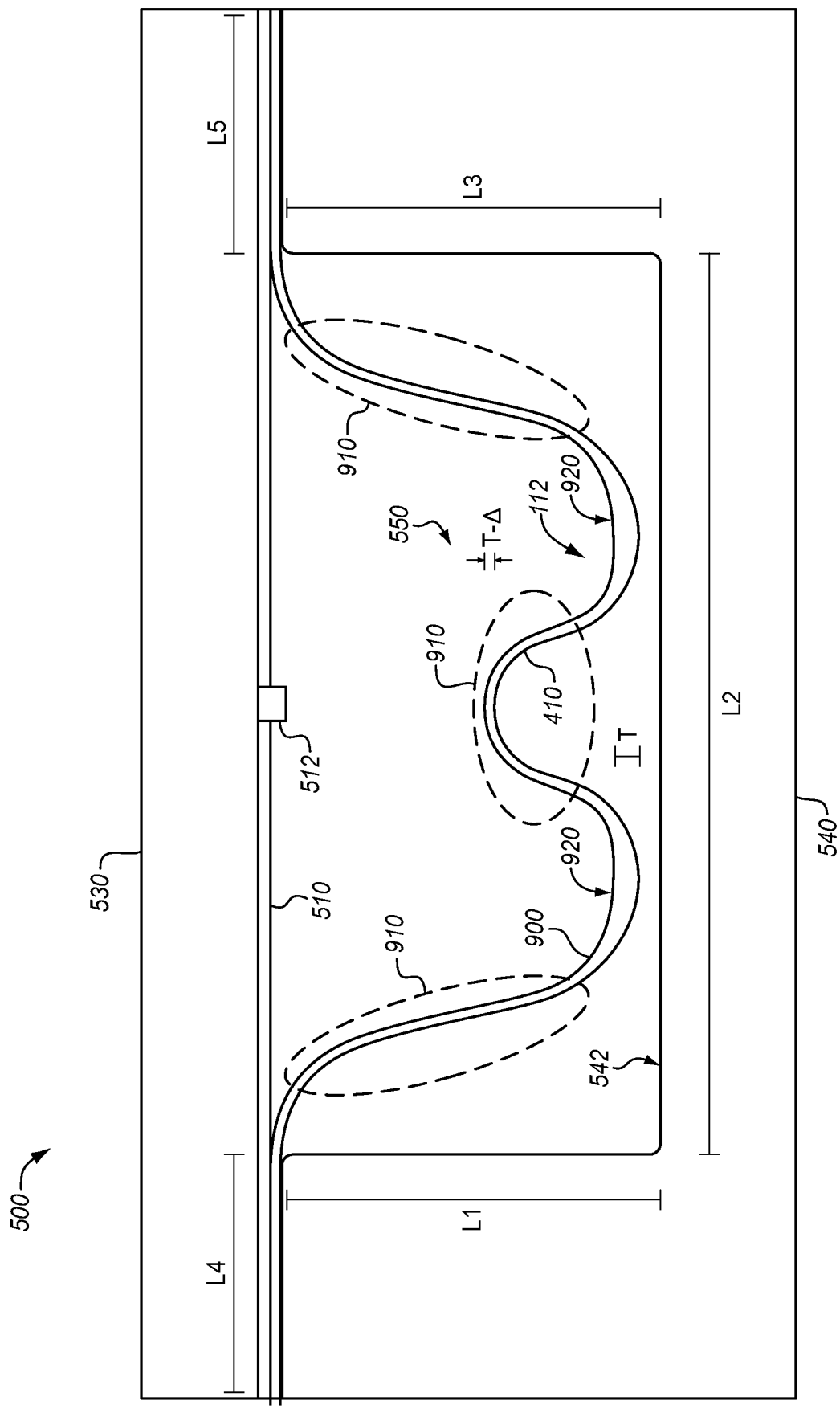
FIGS. 9-10 are side views of a shaping system as a precursor having a non-uniform thickness is shaped into conformity with a forming tool in an illustrative embodiment.
Figure 10:
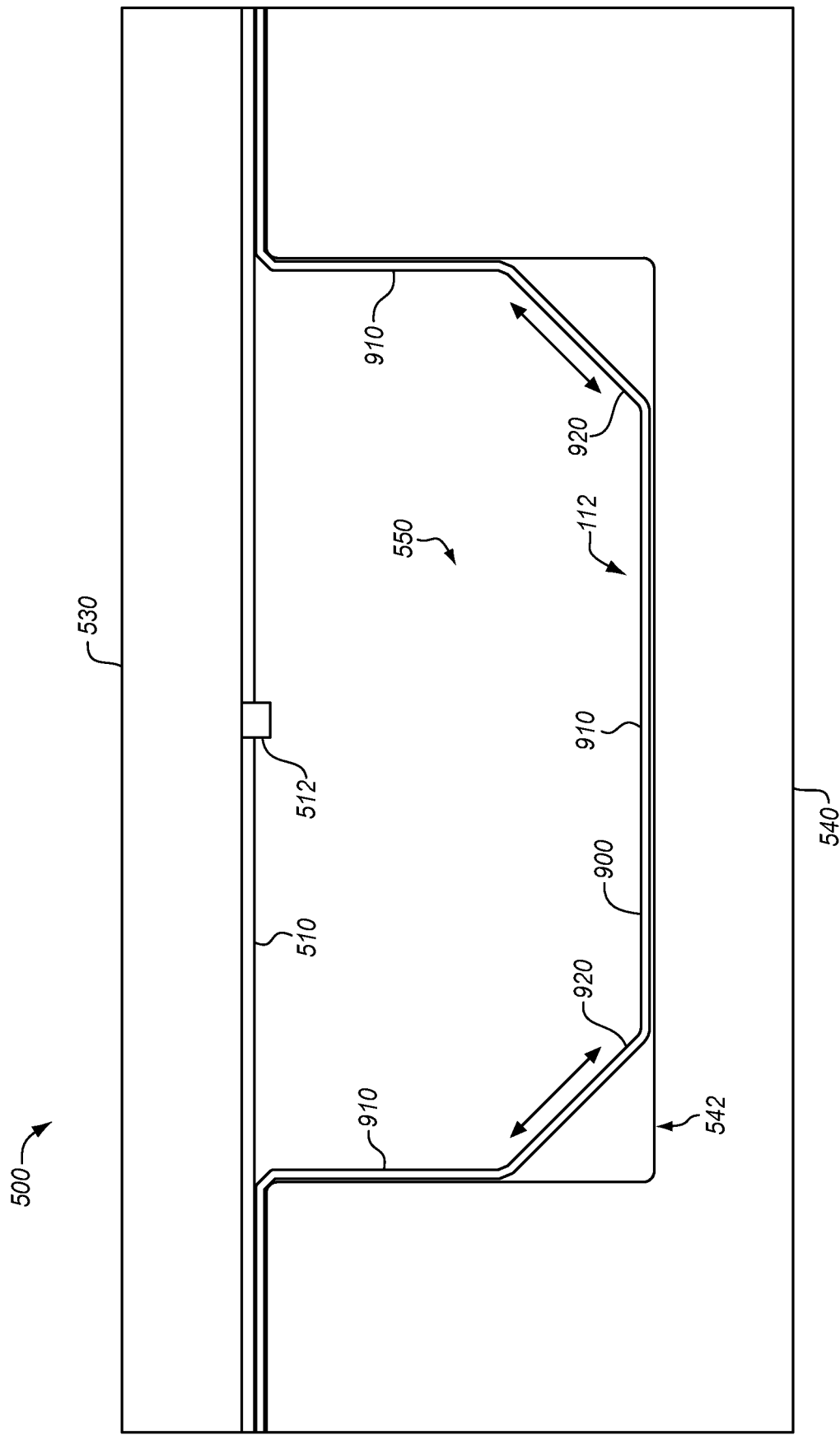

FIGS. 9-10 are side views of a shaping system 500 as a precursor 900 having a non-uniform thickness is shaped into conformity with a forming tool 540 in an illustrative embodiment. Precursor 900 may be fabricated, for example, via incremental sheet forming of a sheet to a contour, or even via additive manufacturing (e.g., 3D printing) techniques. In FIG. 9, precursor 900 includes regions 910 which have a thickness that has been decreased from an original thickness T to a thickness T−Δ due to the incremental sheet forming process. Regions 920 of remaining full thickness are positioned at locations which are expected to experience thinning during shaping of the precursor 900. That is, regions 920 may be regions which are expected to be the last to contact the surface 542 of forming tool 540 during shaping, while regions 920 may be regions which are expected to be the first. That is, regions 920 contact the surface 542 after regions 910 of the precursor 900. As shown in FIG. 10, regions 920 are positioned proximate to corners at surface 542, and are expected to continue to stretch after other regions have contacted surface 542 and have stopped thinning upon reaching a desired level of thickness. By the time that shaping has completed, the thickness of precursor 900 remains approximately uniform across its length, because regions 920 have thinned to match other regions of precursor 900. In short, precursor 112 includes first regions (the regions 910) of a first thickness T−Δ which are expected to contact a forming tool, and second regions (the regions 920) of a second thickness (T) greater than the first thickness which are expected to contact the forming tool after the first regions. That is, precursor 112 exhibits an increased thickness in regions where thinning and elongation is desired.

Examples

Figure 11:
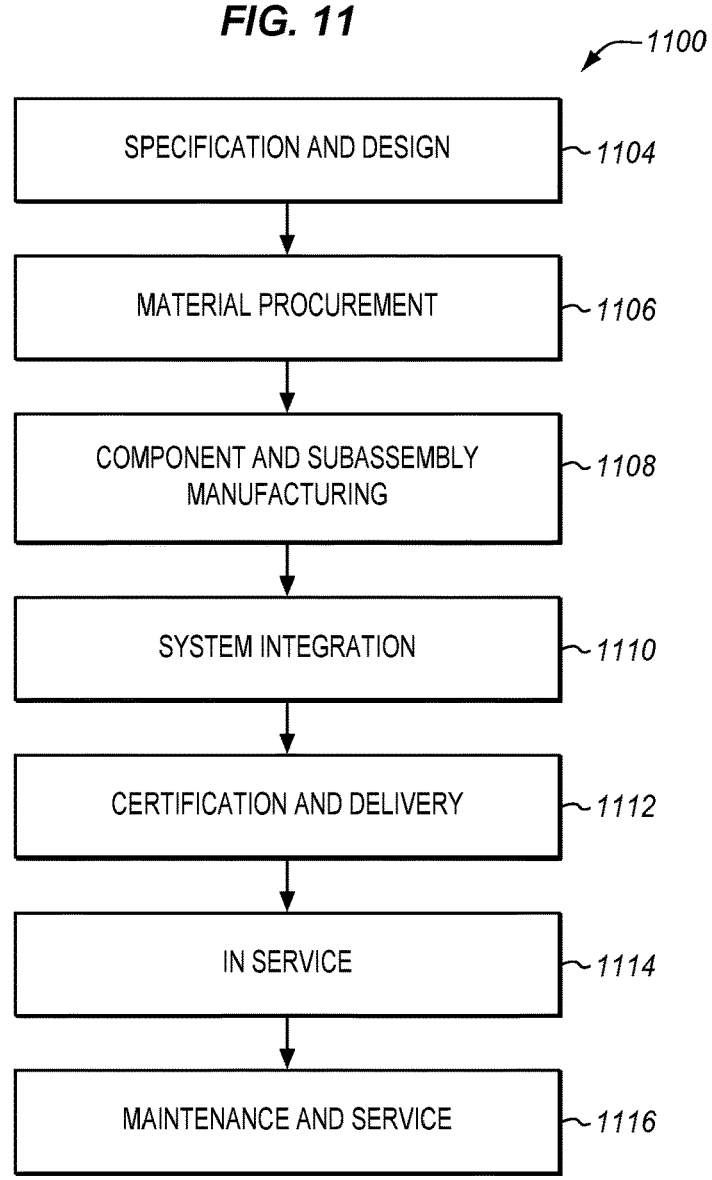
FIG. 11 is a flow diagram of aircraft production and service methodology in an illustrative embodiment.
Figure 12:
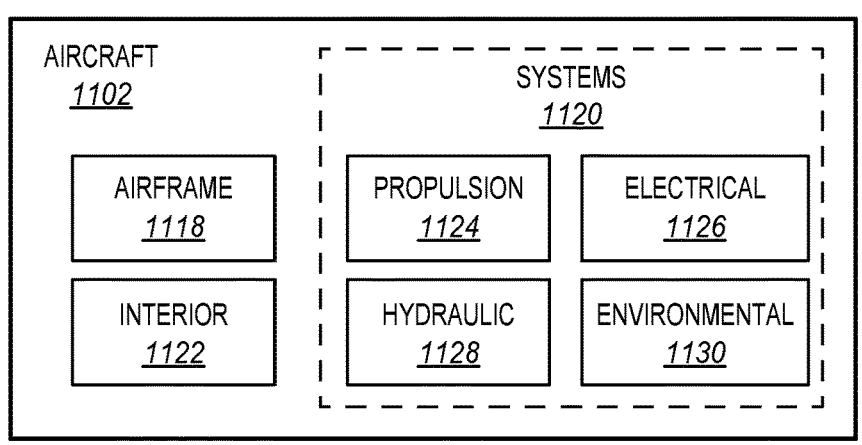
FIG. 12 is a block diagram of an aircraft in an illustrative embodiment.

Referring more particularly to the drawings, embodiments of the disclosure may be described in the context of aircraft manufacturing and service in method 1100 as shown in FIG. 11 and an aircraft 1102 as shown in FIG. 12. During pre-production, method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine work in maintenance and service 1116 (which may also include modification, reconfiguration, refurbishment, and so on). Apparatus and methods embodied herein may be employed during any one or more suitable stages of the production and service described in method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion system 1124, electrical system 1126, hydraulic system 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by method 1100 may include an airframe 1118 with a plurality of systems 1120 and an interior 1122. Examples of systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1100. For example, components or subassemblies corresponding to component and subassembly manufacturing 1108 may be fabricated or manufactured in a manner similar to components or subassemblies produced while the aircraft 1102 is in service. Also, one or more apparatus embodiments, method embodiments, or a combination thereof may be utilized during the subassembly manufacturing 1108 and system integration 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation during the maintenance and service 1116. For example, the techniques and systems described herein may be used for material procurement 1106, component and subassembly manufacturing 1108, system integration 1110, service 1114, and/or maintenance and service 1116, and/or may be used for airframe 1118 and/or interior 1122. These techniques and systems may even be utilized for systems 1120, including, for example, propulsion system 1124, electrical system 1126, hydraulic 1128, and/or environmental system 1130.

In one embodiment, a part comprises a portion of airframe 1118, and is manufactured during component and subassembly manufacturing 1108. The part may then be assembled into an aircraft in system integration 1110, and then be utilized in service 1114 until wear renders the part unusable. Then, in maintenance and service 1116, the part may be discarded and replaced with a newly manufactured part. Inventive components and methods may be utilized throughout component and subassembly manufacturing 1108 in order to facilitate the manufacture of new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a pressure membrane, the method comprising:
   creating a precursor for the pressure membrane from a metal material, the precursor including a contour having a linearized length corresponding with a linearized length of a surface of a forming tool prior to superplastic forming;
   affixing a perimeter of the precursor to a perimeter of a base member for the pressure membrane, leaving a volume between the base member and the precursor;
   altering, via the superplastic forming, a shape of the precursor at a superplastic temperature of the metal material by forcing the precursor into complementary contact with the surface of the forming tool; and
   setting the shape of the precursor while the precursor is held in complementary contact.

2. The method of claim 1 wherein:
   creating the precursor comprises stamp forming a sheet of uniform thickness into the contour.

3. The method of claim 1 wherein:
   creating the precursor comprises incremental sheet forming the precursor.

4. The method of claim 1 wherein:
   creating the precursor comprises additively manufacturing the precursor.

5. The method of claim 1 wherein:
   creating the precursor comprises utilising the metal material selected from a group consisting of: aluminum, titanium, steel, and magnesium.

6. The method of claim 1 wherein:
   altering the shape of the precursor comprises inflating the volume between the base member and the precursor while maintaining a thickness of the precursor at a temperature between six hundred and sixteen hundred degrees Fahrenheit.

7. The method of claim 1 wherein:
   altering the shape of the precursor comprises inflating the volume between the base member and the precursor to force the precursor into complementary contact with the surface of the forming tool.

8. The method of claim 1 wherein:
   affixation of the perimeter of the precursor to the perimeter of the base member is airtight and resistant to failure at superplastic temperatures.

9. The method of claim 1 further comprising:
   creating the pressure membrane from the precursor and the base member.

10. The method of claim 9 wherein:
    the pressure membrane, via the shape of the precursor, is configured to form a composite part into a C-channel.

11. The method of claim 9 wherein:
    the perimeter of the precursor forms an airtight seal with the perimeter of the base member.

12. The method of claim 9 further comprising:
    placing a port into the pressure membrane.

13. The method of claim 1 wherein:
    the precursor is made from a material that exhibits a grain size between one and ten micrometers.

14. The method of claim 1 wherein:
    altering the shape of the precursor is performed at a pressure between twenty and six hundred pounds per square inch.

15. The method of claim 1 wherein:
    affixing the perimeter is performed via a technique selected from a group consisting of: gluing, taping, and welding.

16. A method of hot forming a precursor, the method comprising:
    creating the precursor from a metal material, the precursor including a contour having a linearized length corresponding with a linearized length of a surface of a forming tool prior to superplastic forming;
    heating the precursor to a superplastic temperature of the metal material;
    shaping, via the superplastic forming, the precursor to conform with the surface of the forming tool while the precursor is heated; and
    maintaining a thickness of the precursor after the shaping has been completed.

17. The method of claim 16 further comprising:
    affixing a perimeter of the precursor to a perimeter of a base member, leaving a volume between the base member and the precursor;
    wherein shaping the precursor comprises inflating the volume between the base member and the precursor to force the precursor into complementary contact with the surface of the forming tool.

18. The method of claim 17 further comprising:
    cooling the precursor to set the shape of the precursor while the precursor is held in complementary contact with the surface of the forming tool.

19. The method of claim 16 wherein:
    creating the precursor comprises performing incremental sheet forming.

20. The method of claim 16 wherein:
    shaping the precursor comprises shaping the precursor at a pressure between twenty and six hundred pounds per square inch.

21. An apparatus comprising:
a pressure membrane comprising:
   a base member; and
   a precursor created from a metal material; and
a forming tool having a surface configured to shape the precursor;
wherein the precursor includes a contour having a linearized length corresponding with a linearized length of the surface of the forming tool prior to superplastic forming;
wherein a perimeter of the precursor is affixed to a perimeter of the base member, leaving a volume between the base member and the precursor;
wherein the forming tool is configured to alter, via the superplastic forming, a shape of the precursor at a superplastic temperature of the metal material by forcing the precursor into complementary contact with the surface of the forming tool, and set the shape of the precursor while the precursor is held in complementary contact.

22. The apparatus of claim 21 wherein:
the precursor has a grain size between one micrometer and ten micrometers.

23. The apparatus of claim 21 wherein:
the pressure membrane further comprises a port configured to couple the volume with a pressure source.

24. The apparatus of claim 21 wherein:
the pressure membrane, via the shape of the precursor, is configured to form a composite preform into a C-channel.

25. The apparatus of claim 21 wherein:
the pressure membrane, via the shape of the precursor, is configured to form a composite preform into an I-channel.

26. The apparatus of claim 21 wherein:
the precursor is configured to resist degradation at consolidation temperatures for composite parts ranging between six hundred and fifty, and eight hundred degrees, Fahrenheit.

27. The apparatus of claim 21 wherein:
the forming tool is configured to cool the precursor to set the shape of the precursor while the precursor is held in complementary contact with the surface of the forming tool.

28. The apparatus of claim 21 wherein:
the perimeter of the precursor forms an airtight seal with the perimeter of the base member.

* * * * *